(12) United States Patent
Cordery et al.

(10) Patent No.: US 7,263,529 B2
(45) Date of Patent: Aug. 28, 2007

(54) METHOD AND SYSTEM FOR CREATING AND MAINTAINING A DATABASE OF USER PROFILES AND A RELATED VALUE RATING DATABASE FOR INFORMATION SOURCES AND FOR GENERATING A LIST OF INFORMATION SOURCES HAVING A HIGH ESTIMATED VALUE

(75) Inventors: Robert A. Cordery, Danbury, CT (US); Richard W. Heiden, Shelton, CT (US); Christopher C. Lang, Madison, WI (US)

(73) Assignee: Pitney Bowes Inc., Stamford, CT (US)

( * ) Notice: Subject to any disclaimer, the term of this patent is extended or adjusted under 35 U.S.C. 154(b) by 549 days.

(21) Appl. No.: 10/651,911

(22) Filed: Aug. 29, 2003

(65) Prior Publication Data
US 2005/0050094 A1   Mar. 3, 2005

(51) Int. Cl.
*G06F 17/00* (2006.01)

(52) U.S. Cl. ............... 707/102; 707/101; 707/103 R; 707/104.1

(58) Field of Classification Search ..... 707/100–104.1, 707/200–205
See application file for complete search history.

(56) References Cited

U.S. PATENT DOCUMENTS 6,792,460 B2 * 9/2004 Oulu et al. .............. 709/224
2004/0044677 A1 * 3/2004 Huper-Graff et al. ....... 707/102

* cited by examiner

*Primary Examiner*—Isaac Woo
(74) *Attorney, Agent, or Firm*—Ronald Reichman; Angelo N. Chaclas

(57) ABSTRACT

A method and system for creating and maintaining databases of user profiles and value ratings for information sources, and for generating lists of information sources having high estimated values. User controlled systems for accessing information sources through the internet or other networks are monitored by a server. The server updates the user profiles and computes value ratings associated with the user profiles for various information sources in accordance with monitored information. Estimated values for information sources to a particular user are obtained as a function of the value ratings associated with profiles of other users and the degree of similarity between the particular user's current profile and other user profiles. Previous profiles are not deleted when updated but are retained and treated substantially as other profiles in computing value estimates. Information sources can be other users.

13 Claims, 4 Drawing Sheets

METHOD AND SYSTEM FOR CREATING AND MAINTAINING A DATABASE OF USER PROFILES AND A RELATED VALUE RATING DATABASE FOR INFORMATION SOURCES AND FOR GENERATING A LIST OF INFORMATION SOURCES HAVING A HIGH ESTIMATED VALUE

BACKGROUND OF THE INVENTION

The present invention relates to a system and method for estimating the value of information sources. More particularly it relates to a method and system for estimating the value of information sources to a user based on similarities between the user and other users.

For any particular person the modern world holds a vast number of information sources, which may hold information that is of use or of interest to that person but of which that person is unaware. Such information sources include; databases, either local or remotely accessible over a network such as the Internet; sites, such as web pages, relating to various subjects; and other parties such as professionals or experts in various fields. In addition there is in general more information than a person can consider in a reasonable amount of time, even if they are aware of it. Further, in today's world, a person's interests and priorities are constantly changing, so that the window in which information must be found and evaluated if it is to be useful is often small.

Some existing mechanisms such as newspapers, newsgroups, and rumor mills (i.e. "the grapevine") provide loosely targeted groups of users with general information, typically with little or no attribution, so that a person does not know the support, if any, for the information. Some existing automated systems search specified databases for information, which a person suspects might exist in the specified databases. Other automated systems provide lists of sources ranked by popularity or recommendations of previous users. These systems, however, require the user to have extensive knowledge about what information is sought in order to identify the categories to be investigated. Other existing automated systems, such as banner ad placement algorithms, employ information from monitoring a vendor's systems to target selected advertising to present to on-line customers. For example, an on-line store might offer a user a list of other items purchased by other customers who have previously purchased an item being considered by a first customer. However, such systems are operated by vendors and typically exclude information that does not relate to purchase opportunities and may exclude competitors offerings; and users may be reluctant to entrust such a sales oriented and possibly biased system with extensive personal information.

Thus, though the above described system have proven useful for their intended purposes, there is a need for a method and system for thorough searching and accurate rating of a broad range of available information sources.

BRIEF SUMMARY OF THE INVENTION

The above object is achieved and the disadvantages of the prior art are overcome in accordance with the subject invention by a system and method for generating a list of information sources having a high estimated value to a user. In accordance with the present invention, a system is programmed to carry out a method including the steps of: a) receiving fixed information for each of a plurality of users; b) initializing profiles for each of the users in the user profile database with the fixed information; c) receiving monitored information relating to activities of a user; d) determining if the monitored information relates to a particular information source and, if so, determine a value rating associated with the user for the particular information source in accordance with the monitored information; e) creating an updated profile for the user in the profile database in accordance with the monitored information; f) if a value rating is determined, associating the value rating with the updated user profile and recording the value rating in the related value rating database; and g) determining if the list is to be generated. If so then the system carries out the further steps of: g1) calculating an estimated value to the user of an information source as a function of the user's profile, profiles for others of the users, and value ratings for the information source associated with the other users profiles; g2) repeating step g1 until estimated values have been calculated for all of the information sources; 3) selecting and outputting to the user, or saving for later output, information sources having relatively higher estimated values.

In accordance with one aspect of the subject invention the updated profile includes information selected from the monitored information and used to determine the value rating, or includes the value rating.

In accordance with another aspect of the subject invention the updated profile includes the user's interaction history with regard to an information source.

In accordance with another aspect of the subject invention the user profile database and/or value rating databases are created and maintained by a trusted third party system.

In accordance with another aspect of the subject invention the monitoring step is carried out by directly monitoring interactions between a network and a user controlled system for accessing information sources through the network.

In accordance with still another aspect of the subject invention earlier user profiles and their associated value ratings are retained after updating.

In accordance with still another aspect of the subject invention the estimated value is calculated as:

$$E_{i,n}=\Sigma_x(S_{x,n}\cdot V_{i,x})/X$$

where; a) $E_{i,n}$ is the estimated value to user n of information source i in accordance with the values and interests of user n as indicated by user n's profile $P_n$; b) coefficients $S_{x,n}$ are a measure of similarity between a profile $P_x$ of another user x and the profile $P_n$; c) $V_{i,x}$ is a value rating for the information source i associated with the profile $P_x$; d) $\Sigma_x$ indicates summation over all profiles $P_x$ for which $V_{i,x}$ is defined; and e) $\Sigma_x$ is the total number of profiles $P_x$.

In accordance with still another aspect of the subject invention the estimated value is calculated as:

$$E_{i,n}=\Sigma_k C_{i,k}\cdot Z_{k,n}$$

where; a) $E_{i,n}$ is an estimated value to user n of information source i in accordance with the values and interests of the user n as indicated by the user n's profile $P_n$; b) $C_{i,k}$ are coefficients generated using linear regression methods and relating the information source i to kth variables in profiles; c) $Z_{k,n}$ is the value of the kth variable in the profile $P_n$; and d) $\Sigma_k$ indicates summation over all values of k.

In accordance with still another aspect of the subject invention the estimated value is calculated by: a) generating a neural network associated with information source i; b) training the network using values $Z_{k,x}$ and $V_{i,x}$ from profiles in a set $\{P_x\}$ of profiles for other users x, and for which values $V_{i,x}$ are defined; c) determining $E_{i,n}$ by applying $Z_{k,n}$ to the network; where d) $E_{i,n}$ is an estimated value to user n of information source i in accordance with the values and interests of the user n as indicated by the user n's profile $P_n$; e) $Z_{k,n}$ is the value of the kth variable in the profile $P_n$; and f) $V_{i,x}$ is a value rating for the information source i associated with a profile in the set $\{P_x\}$.

Other objects and advantages of the subject invention will be apparent to those skilled in the art from consideration of the detailed description set forth below and the attached drawings.

DETAILED DESCRIPTION OF PREFERRED EMBODIMENTS OF THE INVENTION

Figure 1:
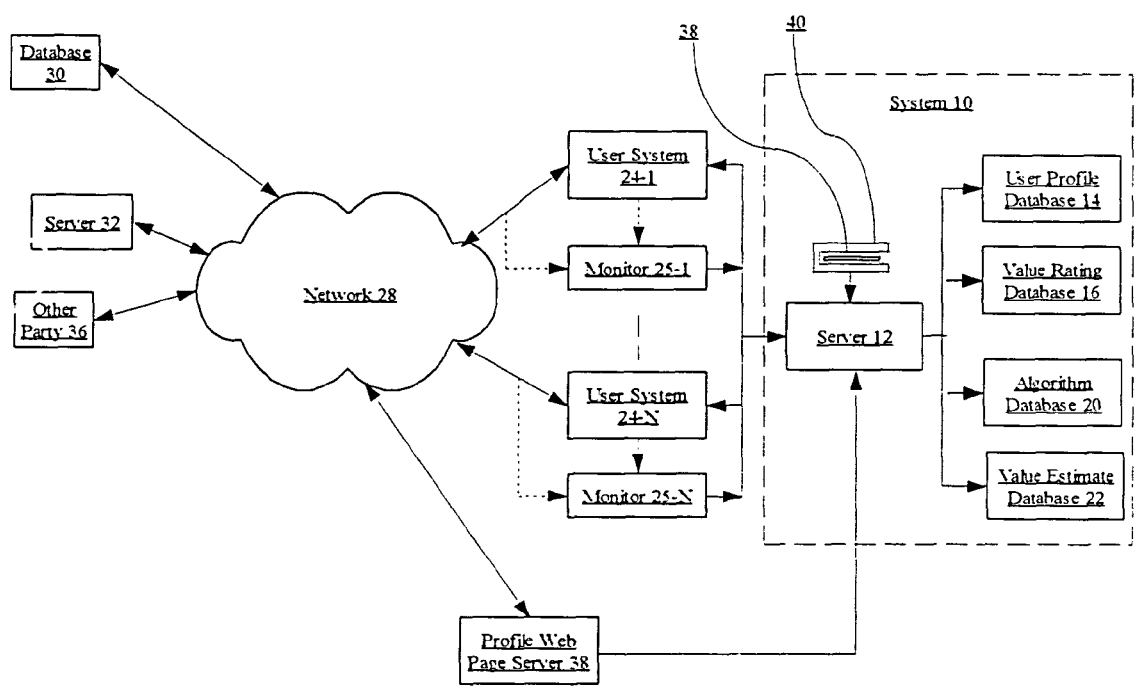
FIG. 1 shows a system in accordance with the present invention together with user systems and various information sources.

FIG. 1 shows system 10 for generating lists of information sources having a high estimated value to a particular system user. System 10 includes server 12, user profile database 14, value rating database 16, algorithm database 20 and value estimate database 22. Server 12 communicates, in any convenient manner, with user controlled systems 24-1 through 24-N, through which system users are connected to network 28, which can be the Internet, an intranet, a switched network, or a local network, or any other convenient mechanism for providing access to multiple information sources, to access various information sources, or collections of information sources such as database 30, server 32 and other party 36. Server 32 can be an Internet Service Provider server which supports web pages, bulletin boards, chat rooms and other information sources. Other party 36 can be an expert or professional who provides information in regard to his or her field. Server 12 also receives information from monitors 25-1 through 25-N, which monitor communications between systems 24-1 through 24-N and network 28 to the various information sources.

In a preferred embodiment monitors 25-1 through 25-N are enabled/disabled by systems 24-1 through 24-N so that users can control monitoring to assure privacy of sensitive communications/activities. Monitors 25-1 through 25-N can be implemented either as special purpose hardware device or as a software routine running on corresponding user systems 24-1 through 24-N. Development of such monitors is well within the ability of those skilled in the art and further description of such monitors is not believed necessary for an understanding of the present invention.

In the embodiment of FIG. 1 server 12 is programmed to carry out the method of the present invention by instructions provided by portable magnetic disk 38 and disk drive 40. In other embodiments of the present invention any other convenient computer readable medium can be used to provide instructions to server 12. The term "computer-readable medium" as used herein refers to any medium that participates in providing instructions to server 12 for execution. Such a medium may take many forms, including but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

In accordance with the present invention server 12 is programmed, as will be described further below, to receive fixed information from system users and to initialize profiles for the users in accordance with the fixed information. (By fixed information herein is meant information relating to a system user which is relatively constant, such as demographic information concerning the user, or answers to survey questions about the user's interests, values, situation, etc. Such information will typically remain unchanged until there is a significant change in the user's circumstances, e.g. a change of job. Typical demographic information might include: birth date, gender, zip code, job, etc. A typical survey question might be: "How important is price to you in making a purchase decision?") In a preferred embodiment user fixed information is input to server 12 in a conventional manner through a web page or the like maintained on profile web page server 38.

Server 12 then receives monitored information relating to the activities of the various users through monitors 25-1 through 25-N. This information is used for two purposes: 1) to create updated user profiles in the user profile database, so that the profiles reflect the current interests of the users, and 2) if the monitored information relates to a particular information source, determine a value rating, linked to a corresponding user profile, for the particular source.

It should be noted that the creation of an updated profile is not intended to imply the deletion of previous profiles or their associated value ratings. In accordance with the precept that we are not the persons we were yesterday, in a preferred embodiment of the present invention, old profiles and their associated value ratings are retained and treated by the system substantially as profiles and ratings of other users. That is, for each user n there exists a set of profiles $\{P_n\}$. Thus profiles; and associated value ratings, relate to a particular user, at a particular time, having particular interests and priorities. By retaining earlier profiles $P_n$ and associated values $V_{i,n}$ a larger sample population of "different" (though correlated) users is created, which it is believed will increase the accuracy of the present invention. Further, these retained profiles and values, together with retained estimated values, can be used to develop and test new models for generating estimated values, as will described further below.

Then, in a preferred embodiment of the present invention, when a list is to be generated for a user, server 12 determines an estimated value for each information source as a function of the profiles of other users (including other, earlier profiles in $\{P_n\}$), and the value rating for each information source associated with those profiles, and the updated current profile, $P_n^+$, of the user. Those sources with high estimated values, e.g. the top 20, or the top 10%, are listed and output to the user. In other embodiments a user can request generation of an updated list of information sources in relation to an earlier profile, for example if a user returns to an earlier, dormant project.

In accordance with another preferred embodiment of the present invention system 10 is a "trusted third party" system. A "trusted third party system" has not only technical security, such as can be provided by combinations of conventional encryption technology, password access, firewalls, means for securing physical access, or the like, but is also operated in a manner which gives the system users a high level of confidence that information they provide to the system will not be used except as they have agreed to its use, and that they will receive thorough, accurate, and unbiased lists of information sources. This level of confidence can be established by procedures which include steps such as publishing operational procedures, audits, contractual guarantees, an open an effective complaint process, a business model which minimizes conflicts of interest and, of course, an emphasis on maintaining a reputation for reliability in this respect. Typically, but not necessarily, a "trusted third party system" will be operated by a party which is actually distinct from the users and the information sources in order to minimize the possibility of conflicts.

Though various elements of system 10 have been shown as physically distinct structures in FIG. 1 for purposes of clarity, those skilled in the art will recognize that the functions of these elements can be carried out by a single data processing system or the like. Particularly, though databases 14, 16, 20, and 22 have been shown, and will be described below, as distinct structures for reasons of clarity, the information contained in these databases can be stored in a single database on a single storage device. Accordingly, reference herein to particular databases is not to be understood as being limited to distinct or separate data structures, but as used herein includes any form of data organization whereby the identified information items can be accessed as a group.

Figure 2:
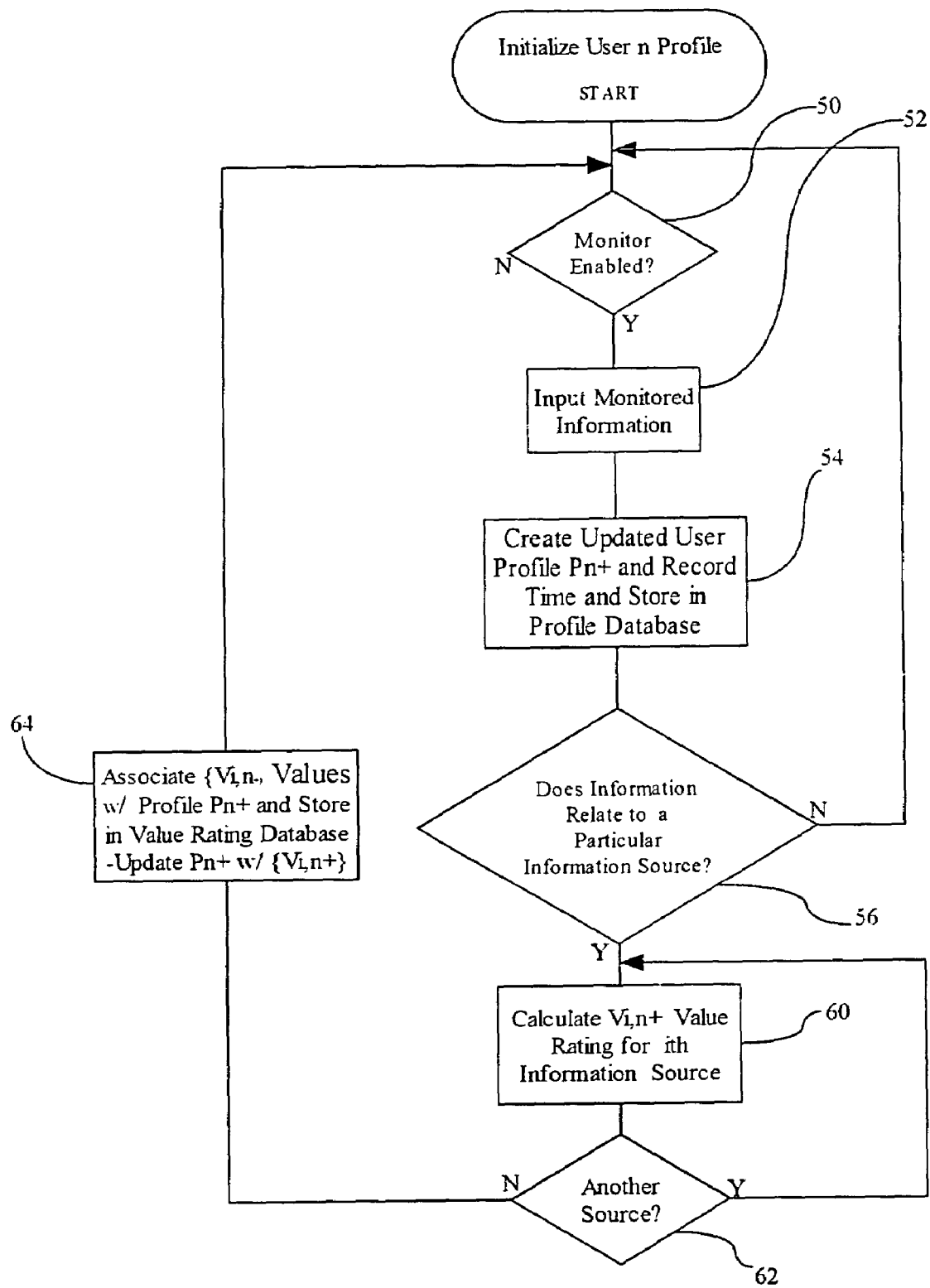
FIG. 2 shows a flow diagram of the operation of the system of FIG. 1 in creating and maintaining a user profile database and a database of related value ratings.

Turning to FIG. 2, initially user n provides fixed information to server 12 to initialize the user's profile. Server 12 then maintains user n's profile in accordance with monitored information received from monitor 25-n. (By "monitored information" herein is meant information based upon, at least in part, monitoring of a user system to recover information from the user's information searches and interactions with various information sources.) By directly monitoring the interactions between user system 24-n and network 28 server 12 is advantageously enabled to obtain a broad spectrum of information about the interests and priorities of user n, as well as information about the full range of information sources considered by user n.

At step 50 server 12 loops until it determines that monitor 25-n has been enabled by user n and, at step 52, inputs monitored information. Monitoring of user system 24-n can be carried out in real-time, or in a batch mode where information is stored in monitor 25-n for batch transmission to server 12, or in any other convenient manner, when monitor 25-n is enabled.

Then, at step 54, server 12 creates a current, updated user profile $P_n^+$ to reflect the monitored information, and records $P_n^+$ and the time in profile database 14. Recording the time of update allows older profiles and value ratings to be weighted less heavily in determining estimated values, as will be described further below. At step 56 server 12 determines if the monitored information relates to a particular information source i, and, if so, at step 60 calculates $V_{i,n}^+$, the value rating of the ith information source, for user n, as will be described further below. At step 58 server 12 determines if the monitored information also relates to another source and, if so, returns to step 60 to calculate Vi,n+ for the other source. Otherwise, at step 56 server 12 returns to step 50.

Calculation of $V_{i,n}^+$ is determined, at least in part, by the monitored interaction history between user n and the ith information source. Factors in this history which are considered in various embodiments of the present invention can include: how many times user n accesses information source i, what search queries where used to identify source i, whether a purchase was made as a result of accessing source i, whether source i was "bookmarked", as well as other factors which will become apparent to those skilled in the art from consideration of the present disclosure. Server 12 can also request user n to provide an express value for source i. These factors are then combined to obtain $V_{i,n}^+$. In a preferred embodiment the factors are combined as a weighted sum.

At present no optimal method for combining factors is believed to be known. However it should be understood that the present invention will be useful (in the sense that information sources identified will be more likely to be useful than randomly chosen sources) if any reasonable method is used to obtain the values $V_{i,n}^+$; e.g. any method which reflects that, other things being equal, that an information source demonstrates more value the more often it is accessed; that bookmarked sources demonstrate more value than sources which are not bookmarked; etc. Thus all such reasonable methods for combining factors to obtain $V_{i,n}^+$ are within the contemplation of the present invention. Further, it should be remembered that the purpose of obtaining values for $V_{i,n}^+$ is to be able to calculate estimated values, $E_{i,x}^+$, for information source i to other users x. As those of other users x, to whom the ith source is identified as having a high estimated value, continue to be monitored and interact, or do not interact, with the ith information source, server 12 will generate values $V_{i,x}$. Thus, as information is accumulated in the databases a person skilled in the art will be able to use well known statistical methods and the data $V_{i,x}^+$; $E_{i,x}^+$ to improve the manner in which the values $V_{i,n}^+$ are obtained.

In a preferred embodiment of the present invention, factors, such as the number of times a source is accessed, obtained from the monitored information and combined to obtain values $V_{i,n}^+$, and/or the values $V_{i,n}^+$ themselves, are also stored as part of profile $P_n^+$ since it is believed that the fact that two persons interact with a particular information source in similar ways, or value a source similarly, is a significant indication that they have similar interests and priorities.

After all values $V_{i,n}^+$ have been calculated, at step 62, server 12 updates the profile for user n and records the time, and at step 64 associates the set of values calculated for various sources $\{V_{i,n}^+\}$ with current updated profile $P_n^+$ and stores $\{V_{i,n}^+\}$ in value rating database 16, and returns to step 50, and further updates $P_n^+$ with $\{V_{i,n}^+\}$.

Figure 3:
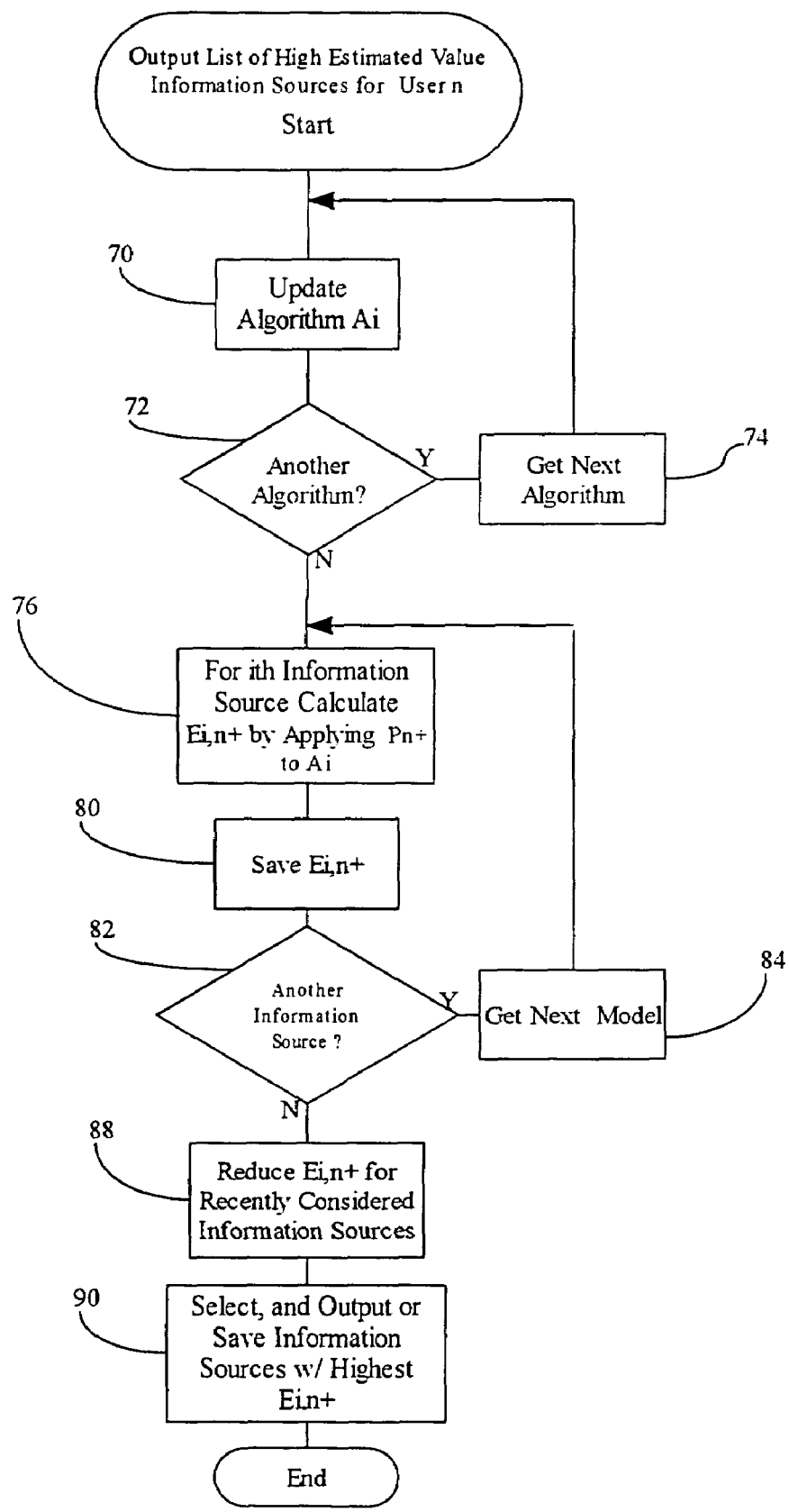
FIG. 3 shows a flow diagram of the operation of the system of FIG. 1 in generating a list of information sources having a high estimated value as the output of an algorithm applied to user profile.

In FIG. 3 a flow diagram of the operation of server 12 in generating a list of information sources having a high estimated value to user n is shown. The determination to generate such a list can be based on any convenient occurrence such as a request by the user, a scheduled time, or a significant change in the profile of the user.

At step 70 server 12 updates algorithms $A_i$ in algorithm database 20 for each information source. Algorithms $A_i$ are used to obtain an estimated value for each information source as a function of the profiles of other users (including other, earlier profiles in $\{P_n\}$), and the value rating for each information source associated with those profiles, and the updated current profile, $P_n^+$, of user n, as will be described further below. Algorithms $A_i$ are updated when new profiles are created and to remove old data; either to conserve storage or processing resources, or because the value ratings linked to the old profiles may represent outdated information sources.

At step 72 server 12 determines if another algorithm exists and, if so gets the next algorithm at step 74 and returns to step 70. Once algorithms $A_i$ are updated as necessary, at step 76 server 12 calculates an estimated value to user n of the ith information source $E_{i,n}^+$ (based on the current interests and priorities of user n) by applying profile $P_n^+$ to $A_i$. At step 80 server 12 saves $E_{i,n}^+$ in value estimate database 22 and, at step 82 determines if another algorithm, for another information source, exists and, if so gets the next algorithm at step 84 and returns to step 76.

Many algorithms suitable for obtaining $E_{i,n}^+$ are known to those skilled in the art and the development of new such algorithms is an active area of research, particularly in the field of statistics. Accordingly, use of any such algorithm is within the contemplation of the subject invention.

In an algorithm for a preferred embodiment of the present invention, a matrix of similarity coefficients Sx,y, which are a measure of the similarity between profiles Px and Py, is established and updated as necessary. The estimated value to user n of the ith information source is then given by the average:

$$E_{i,n}^+=\Sigma_x(S_{x,n}^+ \cdot V_{i,x})/X;$$

where X is number of other profiles considered. In a preferred embodiment the $S_{x,y}$ are cross-correlations, possibly weighted, of $P_x$, $P_y$.

As with the calculation of values $V_{i,n}^+$ discussed above, at present no optimal method for determining coefficients $S_{x,y}$ is believed to be known. However it should be understood that the present invention will be useful if any reasonable method is used to obtain the values $S_{x,y}$; e.g. any method which reflects that, other things being equal, that two profiles are more similar the more elements in the profiles are the same. Thus all such reasonable methods for computing $S_{x,y}$ are within the contemplation of the present invention. Further, as user n continues to be monitored and interact, or not interact, with the ith information source, server 12 will generate values $V_{i,n}^{++}$ (where the "$n^{++}$" notation indicates creation of a new current profile for user n). Thus, as information is accumulated in the databases a person skilled in the art will be able to use well known statistical methods and the data $V_{i,n}^{++}$; $E_{i,n}^+$ to adjust the cross-correlation weights used, or otherwise improve the manner in which the values $E_{i,n}^+$ are obtained.

Those skilled in the art will recognize that certain qualitative variables in the profiles, e.g. zip code, may best be treated as having a binary valued difference, e.g. 1=the same, 0=different, at least initially. As data accumulates it may be found that differences in these variables can be measured more precisely, e.g. Protestants may be found more similar to Catholics than to Buddhists.

In an algorithm for another embodiment of the present invention, well known linear regression methods are used to generate and update coefficients $C_{i,k}$ from values $Z_{k,x}$ and $V_{i,x}$, where $Z_{k,x}$ is the value of the kth variable in $P_x$, such that:

$$E_{i,n}^+=\Sigma_k C_{i,k} \cdot Z_{k,n}^+$$

In an algorithm for another embodiment of the present invention a neural network associated with information sources i can be trained and updated by further training, using values $Z_{k,x}$ and $V_{i,x}$ from profiles in the set $\{P_x\}$ for which $V_{i,x}$ is defined, so that $E_{i,n}^+$ can be generated by applying $Z_{k,n}^+$ to the network.

In a preferred embodiment of the present invention participation by user x in a chat group or the like is a variable in the user's profile $P_x$.

At step 88 values $E_{i,n}^+$ for information sources which have recently been accessed by user n are reduced so that sources which have been recently considered are less likely to be reputedly presented to user n. Again no optimum amount of reduction is believed to be known, but it is believed that a reasonable reduction will be useful, and that, as data is accumulated, the amount of reduction can be optimized using well known statistical methods.

Then at step 90, the information sources having the highest estimated value $E_{i,n}^+$ are selected and output to user system 24-$n$, or saved for output at later convenient time. The sources can be selected as a fixed, or user selected, number having the highest value, a fixed, or user selected, percentage, all sources having a value over a predetermined, or user selected, threshold, or in any other convenient manner. Server 12 then exits.

Because the present invention monitors a broad range of user interaction and maintains profiles with a substantial number of variables, value ratings $V_{i,m}$, and estimates $E_{i,n}^+$ derived therefrom, can be multi-valued, as opposed to binary yes/no or buy/don't buy recommendations, so that a user receiving a list of source will have a quantitative estimate of the likely value of each source.

Figure 4:
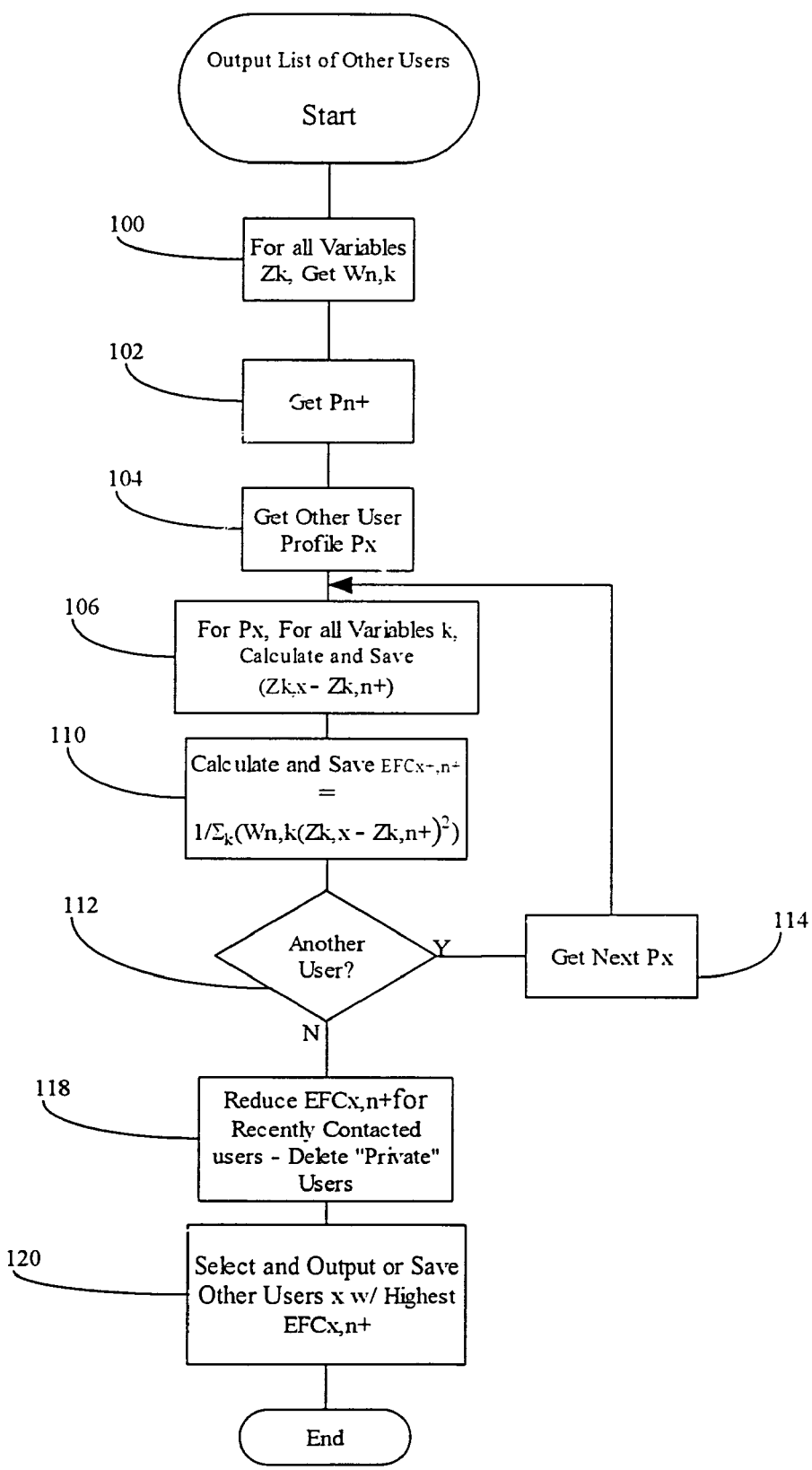
FIG. 4 shows a flow diagram of the operation of the system of FIG. 1 in generating a list of other system users having a high estimated value as information sources.

In FIG. 4 a flow diagram of the operation of server 12, where an information source is contact with another system user having similar interests, in generating a list of other users with whom contact will have a high estimated value to user n is shown. Initially user n defines and inputs to server 12 one or more sets of weights $\{W_{k,n}\}$ to be used to determine an estimate of the value $EFC_{n,x}$ of another system user as an information source or contact; i.e. an estimate of the likely fruitfulness of contact by user n with user x. Different sets $\{W_{k,n}\}$ are defined for different purposes, e.g. one set for a project, another for professional development or networking, and a third for social contact. The determination to generate such a list can be based on any convenient occurrence such as a request by the user, a scheduled time, or a significant change in the profile of the user.

At step 100 server 12 gets the set of weights $\{W_{n,k}\}$ as specified by user n. At step 102 server 12 gets current, updated profile $P_n^+$ for user n, and sets of profiles $\{P_x\}$ for other users x. In a preferred embodiment weights $W_{n,k}$ and defined as variable with time so that similarities between $P_n^+$ and older profiles PX are less heavily weighted in determining estimated fruitfulness of contact $EFC_{n,x}$ between user n and other user x. Also, while establishing contact based on user n's current interests and priorities is generally preferred, in other embodiments user n may wish to use an earlier profile $P_n$ to revisit earlier interests as reflected in an earlier $P_n$.

For user x, for all variables k in Px, at step 106 server 12 calculates $(Z_{k,x}-Z_{k,n})$. As discussed above certain qualitative variables in the profiles, e.g. zip code, may best be treated as having a binary valued difference, e.g. 0=the same, 1=different, at least initially. As data accumulates it may be found that differences in these variables can be measured more precisely, e.g. differences in zip code may converted into approximate distances when seeking social contacts At step 110 server 12 calculates an estimate of the likely fruitfulness of contact between user n and other user x, $EFC_{n,x}$, as:

$$EFC_{n,x}=1/\Sigma_k(W_{n,k}(Z_{k,x}-Z_{k,n}^+)^2);$$

and saves $EFC_{n,x}$, preferably in value estimate database 22.

At step 112 server 12 determines if another user is to be considered and, if so, gets the next profile $P_x$ at step 114 and returns to step 106.

Once all values for $EFC_{x,n}^+$ have been calculated, at step 118 values $EFC_{x,n}^+$ for other users who have recently been contacted by user n are reduced so that users who have been recently contacted are less likely to be repeatedly presented to user n. Again no optimum amount of reduction is believed to be known, but it is believed that a reasonable reduction will be useful, and that, as data is accumulated, the amount of reduction can be optimized using well known statistical methods as user n is monitored and Values $V_{x,n}^+$ are generated for interactions between users n and x in the same manner as values $V_{i,n}^+$ are generated for other types of information sources.

In a preferred embodiment of the present invention users may designate their status as "public" or "private" and server 12 also will delete list "private" users at step 118.

Then at step 120, the other users having the highest estimated value $EFC_{x,n}^+$ are selected and output to user system 24-n, or saved for output at later convenient time. The other users can be selected as a fixed, or user selected, number having the highest value, a fixed, or user selected, percentage, all sources having a value over a predetermined, or user selected, threshold, or in any other convenient manner. Server 12 then exits.

Profiles database 14 can also be queried in a conventional manner. For example, if user n wishes information about an a party, he or she can submit a conventional query, which can be more or less specific, to system 12 and receive a list of other, "public" users who have had the specified kind of contact with the subject party.

It should be noted that while obtaining monitored information through monitoring user systems as described in the above preferred embodiments is preferred, other means of measuring variables which can usefully be included in user profiles, e.g. voice or facial expression monitoring as a measure of excitement or enthusiasm, are believed to be either known or under development. According, any mechanism for monitoring user interactions which can be useful in developing user profiles or value ratings, either known or later developed is within the contemplation of the present invention.

The embodiments described above and illustrated in the attached drawings have been given by way of example and illustration only. From the teachings of the present application those skilled in the art will readily recognize numerous other embodiments in accordance with the subject invention. Accordingly, limitations on the subject invention are to be found only in the claims set forth below.

What is claimed is:

1. A method utilizing a computer for generating a list of information sources having an estimated value to a user wherein at least one information source is present comprising the steps of:
    a) receiving fixed information for each of a plurality of users;
    b) initializing profiles for each of said users in a user profile database with said fixed information;
    c) receiving monitored information relating to activities of a user;
    d) determining if said monitored information relates to a particular information source and, if so, determine a value rating associated with said user for said particular information source in accordance with said monitored information;
    e) creating an updated profile for said user in said profile database in accordance with said monitored information;
    f) if a value rating is determined, associating said value rating with said updated user profile and recording said value rating in said related value rating database; and
    g) determining if a list is to be generated; and if so
        g1) calculating an estimated value to said user of an information source as a function of said user's profile, profiles for others of said users, and value ratings for said information source associated with said other users profiles;
        g2) repeating step g1 until estimated values have been calculated for all of said information sources;
        g3) selecting and outputting to said user, or saving for later output, information sources having estimated values so that said user receiving the list of information sources will have a quantitative estimate of the likely value of each of the sources.

2. A method as described in claim 1 where said estimated value is calculated as:

$$E_{i,n}=\Sigma_x(S_{x,n} \cdot V_{i,x})/X$$

where;
    a) $E_{i,n}$ is the estimated value to user n of information source i in accordance with the values and interests of user n as indicated by user n's current updated profile $P_n$;
    b) coefficients $S_{x,n}$ are a measure of similarity between a profile $P_x$ of another user x and said profile $P_n$;
    c) $V_{i,x}$ is a value rating for said information source i associated with said profile $P_x$;
    d) $\Sigma_x$ indicates summation over all profiles $P_x$ for which $V_{i,x}$ is defined; and
    e) X is the total number of profiles $P_x$.

3. A method as described in claim 2 where, as data is accumulated in said databases, statistical methods are used to adjust said coefficients $S_{x,n}$.

4. A method as described in claim 1 where said estimated value is calculated as:

$$E_{i,n}=\Sigma_k C_{i,k} \cdot Z_{k,n}$$

where;
    a) $E_{i,n}$ is an estimated value to user n of information source i in accordance with the values and interests of said user n as indicated by said user n's profile $P_n$;
    b) $C_{i,k}$ are coefficients generated using linear regression methods and relating said information source i to kth variables in profiles;

c) $Z_{k,n}$ is the value of said kth variable in said profile $P_n$; and d) $\Sigma_k$ indicates summation over all values of k.

5. A method as described in claim 4 where, as data is accumulated in said databases, linear regression methods are used to adjust said coefficients $C_{i,k}$.

6. A method as described in claim 1 where said estimated value is calculated by:
   a) generating a neural network associated with information source i;
   b) training said network using values $Z_{k,x}$ and $V_{i,x}$, from profiles in a set $\{P_x\}$ of profiles for other users x, and for which values $V_{i,x}$ are defined;
   c) determining $E_{i,n}$ by applying $Z_{k,n}$ to said network; where
   d) $E_{i,n}$ is an estimated value to user n of information source i in accordance with the values and interests of said user n as indicated by said user n's profile $P_n$;
   e) $Z_{k,n}$ is the value of said kth variable in said profile $P_n$; and
   c) $V_{i,x}$ is a value rating for said information source i associated with a profile in said set $\{P_x\}$.

7. A method as described in claim 6 where, as data is accumulated in said databases, said network is further trained.

8. A method as described in claim 1 where said calculating step is carried out using said user's current, updated profile $P_n^+$.

9. A method as described in claim 1 where said information source is in contact with another user.

10. A method as described in claim 9 where said estimated value is calculated as:

$$EFC_{n,x}=1/\Sigma_k(W_{n,k}(Z_{k,x}-Z_{k,n})^2)$$

where;
   a) $EFC_{n,x}$ is an estimate of the fruitfulness of contact with other user x by user n;
   b) $W_{n,k}$ are coefficients provided by said user n;
   c) $Z_{k,n}$ is the value of a kth variable in said user n's profile $P_n$;
   d) $Z_{k,x}$ is the value of a kth variable in said other user x's profile $P_x$; and
   e) $\Sigma_k$ indicates summation over all values of k.

11. A method as described in claim 10 where said other user x can select either a private or a public status and will only be included in said list if he or she selects said public status.

12. A system comprising:
   a) a server;
   b) a profile database;
   c) a value rating database;
   d) said server communicating with a profile database and a value rating database;
   e) said server also communicating with a plurality of monitors for monitoring a corresponding plurality of users;
   f) said server being programmed to:
      f1) receive fixed information for each of a plurality of users;
      f2) initialize profiles for each of said users in said profile database with said fixed information;
      f3) monitor a user and receive monitored information relating to said user;
      f4) determine if said monitored information relates to a particular information source wherein at least one particular information sources is present and, if so, determine a value rating for said particular information source in accordance with said monitored information;
      f5) create an updated profile for said user in said profile database in accordance with said monitored information;
      f6) if a value rating is determined, associate said value rating with said updated user profile and record a value rating in said related value rating database; and
      f7) determine if a list is to be generated; and if so
         f7A) calculate an estimated value to said user of an information source as a function of said user's profile, profiles for others of said users, and value ratings for said information source associated with said other users profiles;
         f7B) repeat step f7A until estimated values have been calculated for all of said information sources; and
         f7C) select and output to said user, or save for later output, information sources having estimated values so that said user receiving the information sources will have a quantitative estimate of the likely value of each of the sources.

13. A method utilizing a computer readable storage medium having embedded instructions for providing instructions to a server, said instructions controlling said server to perform the steps of:
   a) receiving fixed information for each of a plurality of users;
   b) initializing profiles for each of a users in said user profile database with said fixed information;
   c) monitoring a user and receive monitored information relating to said user;
   d) determining if said monitored information relates to a particular information source wherein at least one particular information sources is present and, if so, determine a value rating for said particular information source in accordance with said monitored information;
   e) creating an updated profile for a user in said profile database in accordance with said monitored information;
   f) if a value rating is determined, associating said value rating with said updated user profile and record a value rating in said related value rating database; and
   g) determining if a list is to be generated; and if so
      g1) calculating an estimated value to said user of an information source as a function of said user's profile, profiles for others of said users, and value ratings for said information source associated with said other users profiles;
      g2) repeating step gi until estimated values have been calculated for all of said information sources; and
      g3) selecting and output to said user, or save for later output, information sources having estimated values so that said user receiving the information sources will have a quantitative estimate of the likely value of each of the sources.

* * * * *